(12) United States Patent
Tokuda

(10) Patent No.: US 10,556,602 B2
(45) Date of Patent: Feb. 11, 2020

(54) CAR AIR CONDITIONING DUCT AND RAILCAR

(71) Applicant: KAWASAKI JUKOGYO KABUSHIKI KAISHA, Kobe-shi (JP)

(72) Inventor: Ryousuke Tokuda, Kobe (JP)

(73) Assignee: KAWASAKI JUKOGYO KABUSHIKI KAISHA, Kobe-shi (JP)

(*) Notice: Subject to any disclaimer, the term of this patent is extended or adjusted under 35 U.S.C. 154(b) by 19 days.

(21) Appl. No.: 14/766,871

(22) PCT Filed: Feb. 3, 2014

(86) PCT No.: PCT/JP2014/000552
§ 371 (c)(1),
(2) Date: Aug. 10, 2015

(87) PCT Pub. No.: WO2014/125784
PCT Pub. Date: Aug. 21, 2014

(65) Prior Publication Data
US 2016/0009299 A1    Jan. 14, 2016

(30) Foreign Application Priority Data
Feb. 12, 2013   (JP) ................. 2013-024272

(51) Int. Cl.
*B61D 27/00* (2006.01)
*F24F 13/02* (2006.01)
(Continued)

(52) U.S. Cl.
CPC ....... *B61D 27/009* (2013.01); *B60H 1/00564* (2013.01); *B61D 17/12* (2013.01);
(Continued)

(58) Field of Classification Search
CPC .. B61D 27/009; B61D 27/0018; B61D 17/12; F24F 13/0254; F24F 13/0245; B60H 1/00564
(Continued)

(56) References Cited

U.S. PATENT DOCUMENTS 2,491,700 A * 12/1949 Zwerling ................ F16L 3/006
                                                         248/58
4,020,531 A *  5/1977 Ahrens .................. F16L 3/1008
                                                         24/284
(Continued)

FOREIGN PATENT DOCUMENTS

CN        102358305 A    2/2012
JP          3462147 B2  11/2003
(Continued)

OTHER PUBLICATIONS

Nov. 2, 2016 Search Report issued in European Patent Application No. 14751663.7.
(Continued)

*Primary Examiner* — Steven B McAllister
*Assistant Examiner* — Allen R Schult
(74) *Attorney, Agent, or Firm* — Oliff PLC

(57) ABSTRACT

A car air-conditioning duct guides air to a suction side of an air conditioner mounted on a car or guides the air flowing from a blow-off side of the air conditioner. The car air-conditioning duct includes a duct wall having a tubular shape and forming a duct outer surface and a duct inner surface. The duct wall is made of a composite foamed resin material containing polystyrene resin and polyolefin resin.

8 Claims, 9 Drawing Sheets

(51) Int. Cl.
*B60H 1/00* (2006.01)
*B61D 17/12* (2006.01)

(52) U.S. Cl.
CPC ...... *B61D 27/0018* (2013.01); *F24F 13/0245* (2013.01); *F24F 13/0254* (2013.01)

(58) Field of Classification Search
USPC .......................................................... 454/87
See application file for complete search history.

(56) References Cited

U.S. PATENT DOCUMENTS

| | | | | |
|---|---|---|---|---|
| 4,320,084 | A * | 3/1982 | Elgner | B29C 49/0005 |
| | | | | 264/506 |
| 4,353,313 | A * | 10/1982 | Panagin | B61D 17/041 |
| | | | | 105/397 |
| 4,506,699 | A * | 3/1985 | Tschudin-Mahrer | B32B 5/18 |
| | | | | 137/375 |
| 4,711,626 | A * | 12/1987 | Hoyme | F23L 3/00 |
| | | | | 126/285 R |
| 5,125,199 | A * | 6/1992 | Whitney | H02G 3/283 |
| | | | | 138/157 |
| 2006/0207471 | A1 * | 9/2006 | Todori | B60H 1/00371 |
| | | | | 105/396 |
| 2008/0251651 | A1 * | 10/2008 | Jackson | F16L 3/1016 |
| | | | | 248/62 |
| 2009/0309358 | A1 * | 12/2009 | Gray | F16L 9/003 |
| | | | | 285/363 |
| 2010/0330316 | A1 * | 12/2010 | Cao | B32B 1/08 |
| | | | | 428/36.5 |
| 2012/0135173 | A1 | 5/2012 | Tsuchida et al. | |

FOREIGN PATENT DOCUMENTS

| | | |
|---|---|---|
| JP | 2007-247944 A | 9/2007 |
| JP | 2009-012527 A | 1/2009 |
| JP | 3157009 U | 1/2010 |
| JP | 2011-38669 A | 2/2011 |
| JP | 2012-132645 A | 7/2012 |
| WO | 2009/128440 A2 | 10/2009 |

OTHER PUBLICATIONS

May 13, 2014 International Search Report issued in International Patent Application No. PCT/JP2014/000552.
May 13, 2014 Written Opinion issued in International Patent Application No. PCT/JP2014/000552.
Feb. 27, 2017 Office Action issued in Chinese Patent Application No. 201480007080.1.

* cited by examiner

CAR AIR CONDITIONING DUCT AND RAILCAR

TECHNICAL FIELD

The present invention relates to a car air-conditioning duct which guides air to a suction side of an air conditioner mounted on a car or guides the air flowing from a blow-off side of the air conditioner mounted on the car, and a railcar including the air conditioning duct.

BACKGROUND ART

Typically, a railcar includes an air conditioning duct which guides conditioned air blowing off from an air conditioner or returns air suctioned to the air conditioner. The air conditioning duct is required to have airtightness and a heat insulating property. Especially, the air conditioning duct of the railcar is also required to satisfy a specific requirement of design, such as flame retardancy or lightness (see PTL 1, for example).

The air conditioning duct disclosed in PTL 1 includes a duct main body and a film member. The duct main body is made of glass wool which is hard to such a degree that the glass wool stands by itself. The duct main body has a square tube shape. The film member has a double-layer structure including an aluminum foil layer and a resin layer and is attached to a surface (an inner surface or an outer surface) of the duct main body. The film member forms one surface of the entire air conditioning duct and blocks the flow of the air from an inside of the duct to an outside of the duct.

Since the duct main body is hard to such a degree that the duct main body stands by itself, shape stability of the entire air conditioning duct can be maintained. Since the duct main body is made of glass wool having sound absorbency and incombustibility, some of the requirements of design of the air conditioning duct can be satisfied. Since the thin film member is attached to the surface of the glass wool duct main body so as to block the flow of the air, a high heat insulating property obtained by a continuous air chamber in the glass wool can be maintained, and condensation can be prevented. In addition, while avoiding an increase in size of the structure, the airtightness of the entire air conditioning duct can be increased. Since the air conditioning duct is constituted by the glass wool duct main body and the thin film member, the air conditioning duct is lighter than an air conditioning duct including a metal duct main body.

CITATION LIST

Patent Literature

PTL 1: Japanese Patent No. 3462147

SUMMARY OF INVENTION

Technical Problem

The production of the above air conditioning duct requires a step of hardening the glass fiber such that the glass wool obtains adequate hardness for application to the duct main body. In addition, the production of the above air conditioning duct requires a step of preparing the film member having the double-layer structure and attaching the film member to the duct main body. The above air conditioning duct simultaneously satisfies various requirements of design (such as the shape stability, the sound absorbency, the incombustibility, the high heat insulating property, the airtightness, the lightness, etc.) when used for the railcar, and therefore, exhibits excellent effects. However, there is still room for improvement regarding the simplification of the production steps and the other requirements of design.

An object of the present invention is to provide a car air-conditioning duct improved so as to simultaneously satisfy various requirements of design (such as the shape stability, the lightness, the airtightness, the heat insulating property, and the simplification of the production steps) and a railcar including the car air-conditioning duct.

Solution to Problem

A car air-conditioning duct according to one aspect of the present invention is configured to guide air to a suction side of an air conditioner mounted on a car or guide the air flowing from a blow-off side of the air conditioner, the car air-conditioning duct including a duct wall having a tubular shape and forming a duct outer surface and a duct inner surface, the duct wall being made of a composite foamed resin material containing polystyrene resin and polyolefin resin.

A railcar according to another aspect of the present invention includes: an air conditioner configured to adjust a temperature of suctioned air and blow out the air; and an air conditioning duct configured to guide air to a suction side of the air conditioner or guide the air flowing from a blow-off side of the air conditioner, the air conditioning duct including a duct wall having a tubular shape and forming a duct outer surface and a duct inner surface, and the duct wall being made of a composite foamed resin material containing polystyrene resin and polyolefin resin.

According to the above configuration, the duct wall forming the duct outer surface and the duct inner surface is made of the composite foamed resin material. Therefore, the air conditioning duct becomes equal in weight to or lighter than an air conditioning duct including a duct main body made of glass wool. In addition, the airtightness of the air conditioning duct can be maintained by the duct wall by itself. Therefore, a step of assembling an additional member to the duct wall to secure the airtightness and a step of preparing the additional member may be omitted, and the air conditioning duct may be configured such that the duct wall forms the duct outer surface and the duct inner surface. The composite foamed resin material is prepared by containing the polyolefin resin in the polystyrene resin. Therefore, by the composite foamed resin material, the duct wall can obtain high rigidity and high heat insulating property of the polystyrene resin and high impact resistance and high toughness of the polyolefin resin. Thus, the shape stability can also be secured.

Advantageous Effects of Invention

As is clear from the above explanations, the present invention can provide a car air-conditioning duct improved so as to simultaneously satisfy various requirements of design (such as the shape stability, the lightness, the airtightness, the heat insulating property, and the simplification of the production step) and a railcar including the car air-conditioning duct.

DESCRIPTION OF EMBODIMENTS

Figure 1:
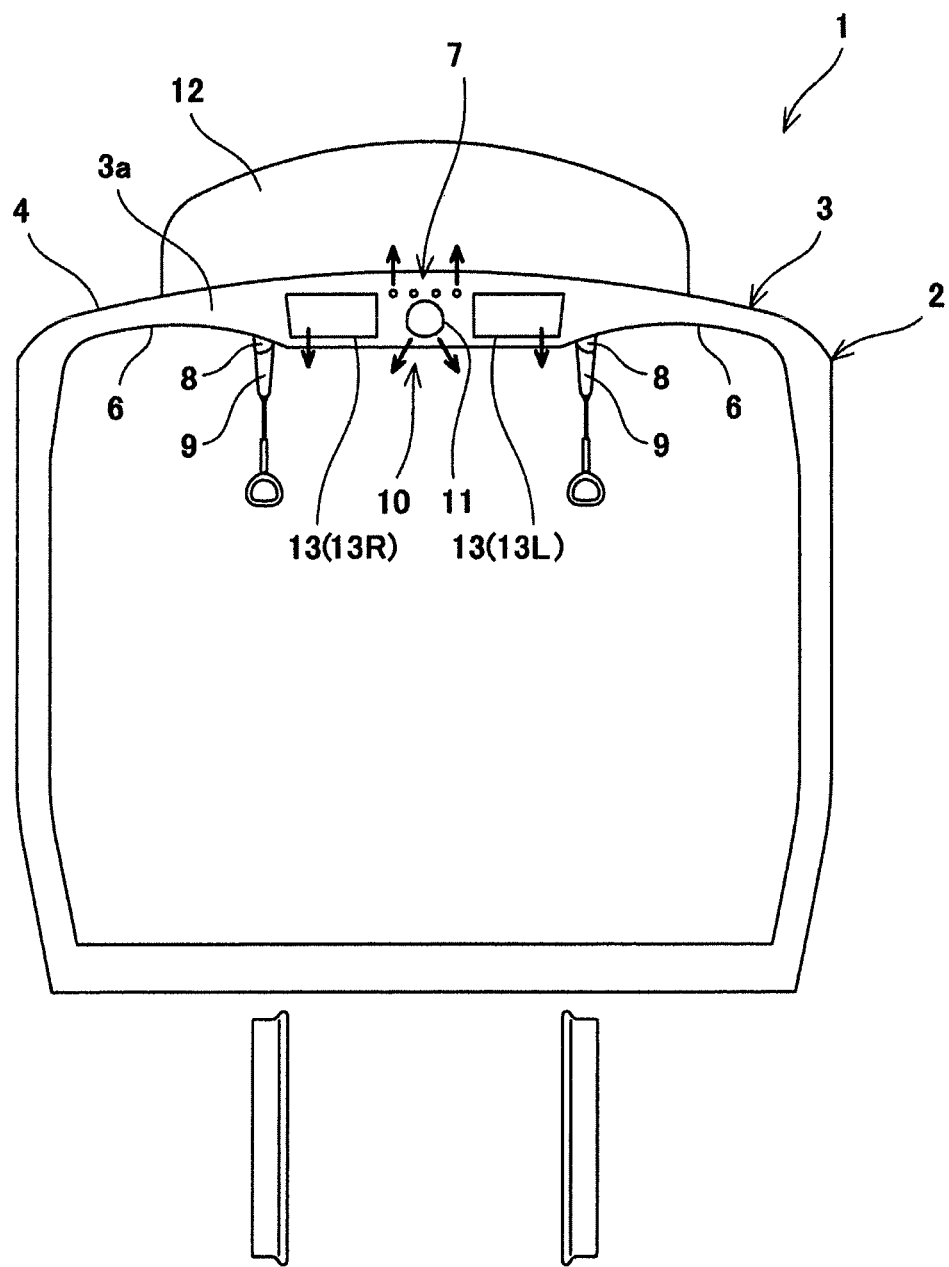
FIG. 1 is a schematic front cross-sectional view showing a schematic configuration of a railcar according to an embodiment.

Hereinafter, an embodiment will be explained in reference to the drawings. In the drawings, the same reference signs are used for the same or corresponding components, and a repetition of the same explanation is omitted.

FIG. 1 is a schematic front cross-sectional view showing a schematic configuration of a railcar 1 according to the embodiment. As shown in FIG. 1, a carbody 2 of the railcar 1 includes a roof bodyshell 3 at an upper portion of the carbody 2. The roof bodyshell 3 includes a roof plate 4, a ceiling plate 5, and a pair of side ceilings 6. The roof plate 4 is an outside plate. The ceiling plate 5 is located under the roof plate 4 and constitutes a car width direction middle portion of a car interior ceiling. The side ceilings 6 are continuous from respective left and right end portions of the ceiling plate 5 and constitute respective car width direction outside portions of the car interior ceiling. The roof bodyshell 3 includes therein an internal space 3a surrounded by the roof plate 4, the ceiling plate 5, and the side ceilings 6. The roof plate 4 constitutes an upper wall of the internal space 3a, and the ceiling plate 5 and the side ceilings 6 constitute a bottom wall of the internal space 3a.

The internal space 3a is used as a rig space and accommodates power feed wiring bodies 7, structures for supporting in-car facilities (such as interior lights 8 and strap rod brackets 9) attached to the car interior ceiling, components of an air conditioning system 10, and the like. The wiring bodies 7 may be provided at an upper portion and car width direction middle portion of the internal space 3a so as to extend in a car lengthwise direction. The interior lights 8 may form a pair in a left/right direction, and the strap rod brackets 9 may form a pair in the left/right direction. In this case, each of the left interior light 8 and the left strap rod bracket 9 may be arranged between the ceiling plate 5 and the left side ceiling 6 in a car width direction, and each of the right interior light 8 and the right strap rod bracket 9 may be arranged between the ceiling plate 5 and the right side ceiling 6 in a car width direction.

To maintain a comfortable air environment in the car interior, the railcar 1 includes the air conditioning system 10. In the present embodiment, the air conditioning system 10 mainly includes a plurality of line flow fans 11, one or more air conditioners 12, and one or more air conditioning ducts 13. The line flow fans 11 are accommodated in the internal space 3a of the roof bodyshell 3. Each of the line flow fans 11 is arranged at a car width direction middle portion and lower portion of the internal space 3a. In the present embodiment, the line flow fan 11 is arranged under the wiring bodies 7. The line flow fans 11 are lined up in the car lengthwise direction, and each of the line flow fans 11 extends in the car lengthwise direction (see FIG. 5). The air blowing off from the line flow fans 11 is supplied to the car interior through grills (not shown) provided at a car width direction middle portion of the ceiling plate 5.

Figure 2:
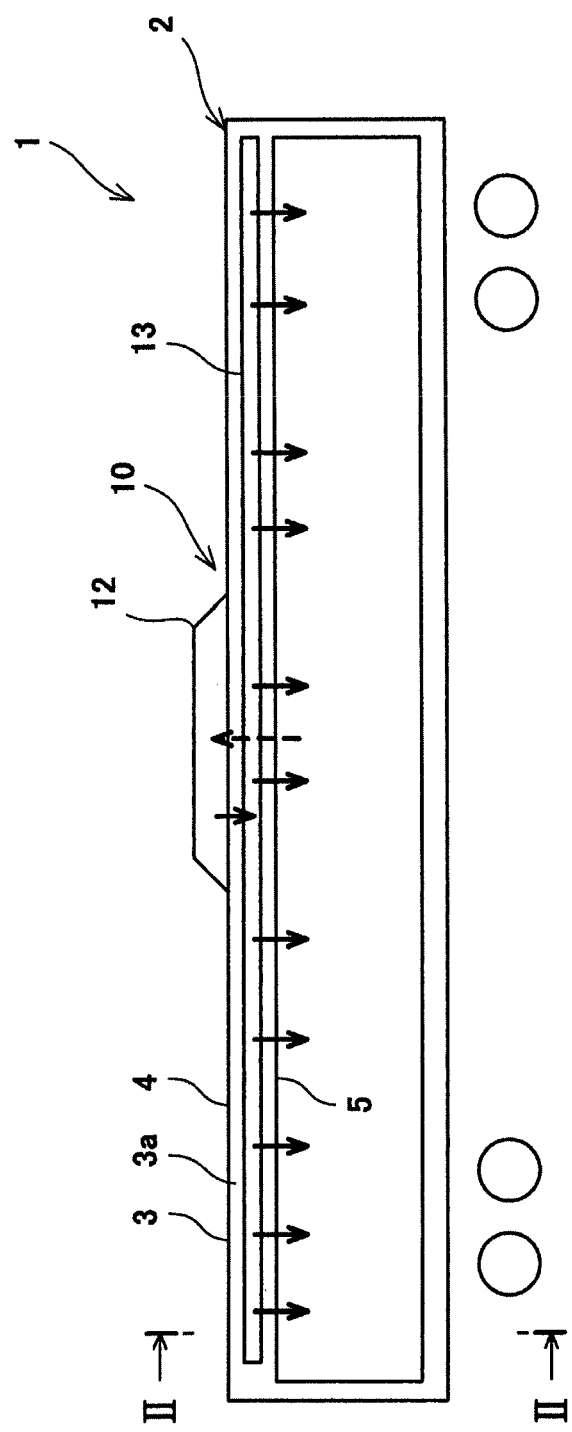
FIG. 2 is a schematic side cross-sectional view showing a schematic configuration of the railcar shown in FIG. 1.

FIG. 2 is a schematic side cross-sectional view showing a schematic configuration of the railcar 1 shown in FIG. 1. As shown in FIG. 2, in the present embodiment, the air conditioning system 10 is a so-called ceiling concentrated type, and the single air conditioner 12 is arranged on the roof bodyshell 3 and at a car lengthwise direction middle portion of the carbody 2. The air conditioner 12 suctions the air from the car interior, adjusts the temperature of the suctioned air, and blows off the temperature-adjusted air (hereinafter may be referred to as "conditioned air"). The blown-off conditioned air is supplied to the air conditioning ducts 13. The air conditioning ducts 13 guide the conditioned air flowing from a blow-off side of the air conditioner 12 to supply the conditioned air to the car interior.

As shown in FIG. 1, the air conditioning ducts 13 (13L and 13R) are accommodated in the internal space 3a of the roof bodyshell 3, form a pair in the left/right direction, and are arranged so as to sandwich the line flow fans 11 in the car width direction. The left air conditioning duct 13L has a structure symmetrical with the right air conditioning duct 13R in the car width direction. As shown in FIG. 2, the air conditioning ducts 13 (FIG. 2 shows only the air conditioning duct 13R) extend in the car lengthwise direction in the internal space 3a from a front end portion of the internal space 3a to a rear end portion of the internal space 3a. Each of the air conditioning ducts 13 includes a plurality of blow-off ports 13d (see FIGS. 3 to 5) arranged at intervals in the car lengthwise direction. The blow-off ports 13d are provided at a bottom wall of the air conditioning duct 13. Grills (not shown) are provided at respective portions of the ceiling plate 5, the portions overlapping the respective blow-off ports 13d in a plan view (i.e., the grills are provided at car width direction left and right end portions of the ceiling plate 5). The conditioned air flows through the air conditioning ducts 13 and then flows out from the air conditioning ducts 13 through the blow-off ports 13d to be supplied to the car interior through the grills. It should be noted that these grills may be formed integrally with or separately from the above-described grills opposing to the line flow fans 11 in an upper/lower direction.

Figure 3:
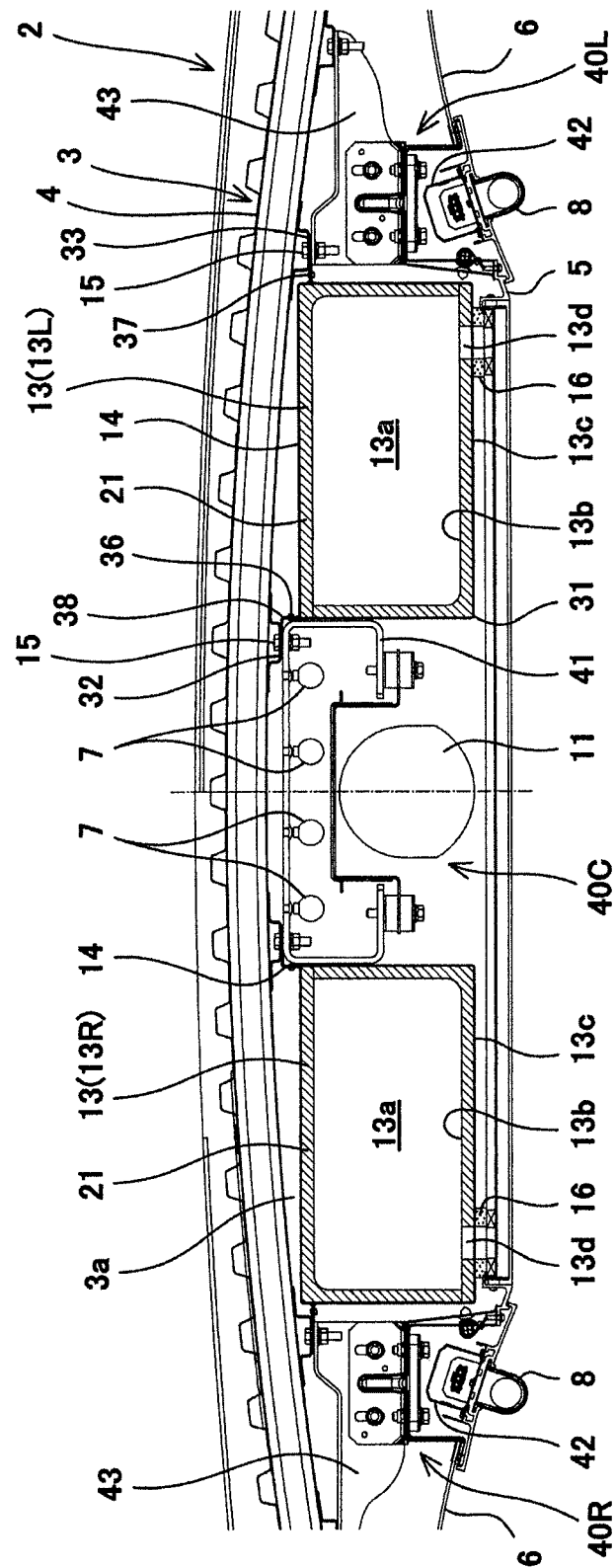
FIG. 3 is a cross-sectional view showing the vicinity of a roof bodyshell shown in FIG. 1.

FIG. 3 is a cross-sectional view showing the vicinity of the roof bodyshell 3 shown in FIG. 1. As shown in FIG. 3, the air conditioning duct 13 includes a duct wall 21 formed in a tubular shape so as to define a duct passage 13a by and through which the air is guided and flows. In the present embodiment, the duct wall 21 includes an upper wall, a bottom wall, a left side wall, and a right side wall and has a rectangular cross section. The cross-sectional shape of the air conditioning duct 13 may be suitably changed depending on the shape of a secured space. Examples of the cross-sectional shape of the air conditioning duct 13 include a trapezoidal shape and a triangular shape.

The tubular duct wall 21 forms a duct inner surface 13b and a duct outer surface 13c. The duct inner surface 13b defines the duct passage 13a. The duct outer surface 13c is an outer surface of the entire air conditioning duct 13. Conventionally used as the duct wall is a duct wall formed by attaching a flat-plate heat insulating member to an inner surface of a metal plate made of an aluminum alloy or a duct wall formed by attaching a composite film, made of metal and resin, to an inner surface or outer surface of glass wool. The duct wall 21 according to the present embodiment is made of a foamed resin material and is produced by a single material in a thickness direction. A foaming ratio may be suitably changed in a range from 10 to 40 times, and a bead in-mold foam molding method may be used as a molding method.

As above, in a case where the duct wall 21 is made of the foamed resin material by itself, the airtightness and the heat insulating property can be secured. In addition, the duct wall 21 is lighter than the conventional duct wall constituted by the metal plate (about one eighth to one fifth) and is lighter than the conventional duct wall constituted by the glass wool and the film (about one second to one third). Further, a conventionally required step of attaching two parts to each other can be omitted, so that labor for producing the air conditioning duct 13 can be saved. Since the foamed resin material has a sound insulation performance, the air conditioning duct 13 having an excellent sound insulation property can be realized.

A composite resin foamed material containing polystyrene resin and polyolefin resin can be especially preferably used as the foamed resin material. With this, even in a case where the duct wall 21 is made of the composite resin foamed material by itself, the duct wall 21 can obtain high rigidity and high heat insulating property of the polystyrene resin and high impact resistance and high toughness of the polyolefin resin. Thus, the shape stability can also be secured. It should be noted that each of a content ratio of the polystyrene resin and a content ratio of the polyolefin resin may have a gradient in the thickness direction. For example, the content ratio of the polyolefin resin may be higher than the content ratio of the polystyrene resin in the vicinity of the outer surface and the inner surface. With this, the impact resistance of the duct wall 21 can be improved.

The composite resin foamed material may be subjected to flameproofing. With this, the flame retardancy required for the application of the railcar is easily secured. Examples of the flameproofing include: a method of kneading a flame retardant (and a flame retardant promoter according to need) into the composite resin foamed material before or during a foaming treatment; and a method of applying the flame retardant to a surface of a face plate member obtained after the foaming treatment.

Figure 4A:
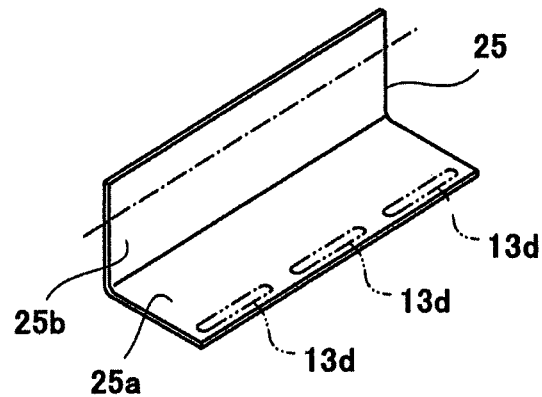
FIGS. 4A to 4C are diagrams showing production steps of an air conditioning duct shown in FIG. 3.
Figure 4B:
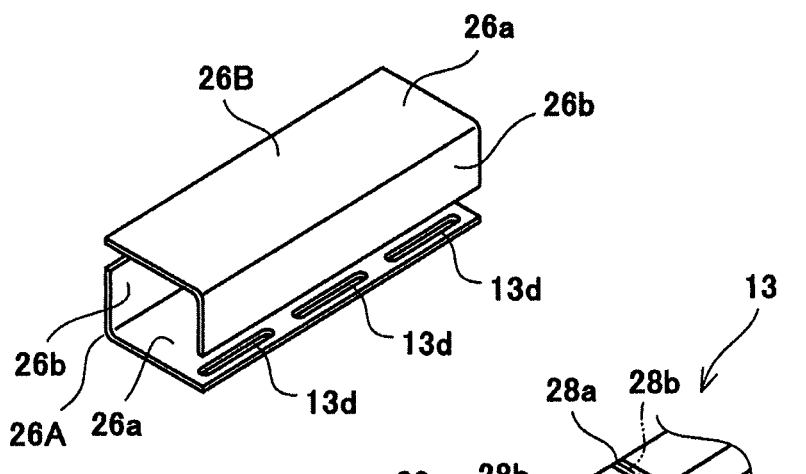
Figure 4C:
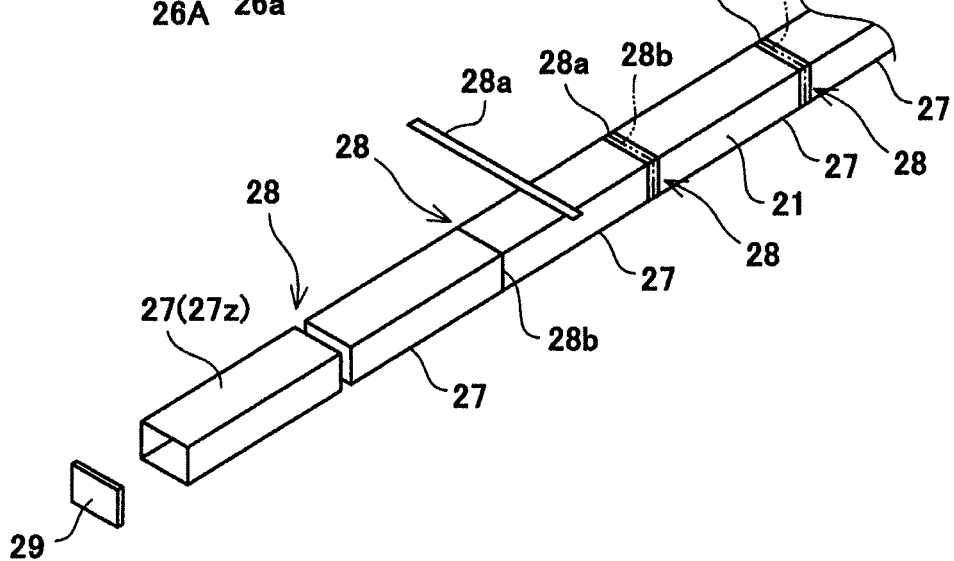

FIGS. 4A to 4C are diagrams showing production steps of the air conditioning duct 13 shown in FIG. 3. As shown in FIG. 4A, first, face plate members 25 made of the foamed resin material are prepared. In the present embodiment, two face plate members 25 are prepared (FIG. 4A shows only one face plate member 25). Each of the face plate members 25 includes a first flange 25a and a second flange 25b and has an L-shaped cross section. Regarding the first face plate member 25 shown in FIG. 4A, the first flange 25a forms one of the upper wall and bottom wall of the duct wall 21 (see FIG. 3) (in the present embodiment, the bottom wall) when in a completed state, and the second flange 25b forms one of left and right side walls of the duct wall 21 (in the present embodiment, a car width direction inner side wall) when in the completed state. In contrast, regarding the second face plate member not shown in FIG. 4A, the first flange forms a wall (in the present embodiment, the upper wall) opposing to the first flange 25a of the first face plate member 25, and the second flange forms a wall (in the present embodiment, a car width direction outer side wall) opposing to the second flange 25b of the first face plate member 25.

Next, as shown by dashed lines in FIG. 4A, the face plate member 25 is subjected to cutting and boring. Since the face plate member 25 is made of the foamed resin material, the face plate member 25 can be easily cut and bored by using a tool, such as a cutter, which can generate heat by power feed. For example, the first flange 25a and/or the second flange 25b are/is cut such that: the cross-sectional shape of the duct passage 13a in the completed state becomes a required shape; and a cross-sectional area of the duct passage 13a in the completed state becomes a required value. In a case where the side wall is reduced in height, the second flange 25b is subjected to the cutting. Since the cross-sectional shape of the duct passage 13a is rectangular in the present embodiment, lengths of the first flanges 25a of the two face plate members 25 are set to be equal to each other, and lengths of the second flanges 25b of the two face plate members 25 are also set to be equal to each other. As described above, since a space secured as the internal space 3a differs depending on cars, the cross-sectional shape of the air conditioning duct 13 is changed in accordance with the internal space 3a. Since the air conditioning duct 13 is constituted by the face plate member 25 which can be cut easily, the shape of the air conditioning duct 13 can be easily changed depending on cars. In addition, the blow-off ports 13d are formed so as to penetrate the first flange 25a which forms the bottom wall of the duct wall 21 in the completed state. The air conditioning duct 13 is constituted by combining the face plate members each having the L-shaped cross section. Face plate members each having a U-shaped cross section may be combined, or rectangular flat plates may be combined.

Next, as shown in FIG. 4B, obtained face plate members 26A and 26B are combined with each other. Thus, a duct body 27 is foamed in a tubular shape by the duct wall 21 made of the foamed resin material. In the present embodiment, the first face plate member 26A having the L-shaped cross section and the second face plate member 26B having the L-shaped cross section are arranged in point symmetry. An end edge portion of a first flange 26a of the first face plate member 26A is joined to an end edge portion of a second flange 26b of the second face plate member, and an end edge portion of a second flange 26b of the first face plate member 26A is joined to an end edge portion of a first flange 26a of the second face plate member 26B. For example, an adhesive suitable for the foamed resin material is used for the joining. To secure the airtightness, the adhesive may also serve as a sealing member.

Next, as shown in FIG. 4C, a plurality of duct bodies 27 are connected to one another in a longitudinal direction to constitute the air conditioning duct 13. A first end portion of the duct body 27 is joined to a second end portion of the adjacent duct body 27 via a joint portion 28. In the present embodiment, at the joint portion 28, a rectangular end surface of the first end portion of the duct body 27 opposes to a rectangular end surface of the second end portion of the adjacent duct body 27, and the outer and inner surfaces of the duct body 27 are arranged so as to be flush with the respective outer and inner surfaces of the adjacent duct body 27. A band-shaped tape 28a is wound around outer surfaces of two duct bodies 27 at least once so as to cover a parting line 28b between the two duct bodies 27 and spread over the two duct bodies 27. An aluminum tape to which a solventless adhesive is applied can be suitably adopted as the tape 28a. With this, the joining strength and the airtightness can be secured.

Instead of simply opposing the end surfaces to each other at the joint portion 28, the joint portion 28 may be configured such that: a protruding portion such as an engaging claw is provided at the first end portion of the duct body 27; a recess such as a slit is provided at the second end portion of the adjacent duct body 27; and the protruding portion is engaged with the recess. With this, the joint strength improves, and work of winding the tape 28a is simplified.

A closing member 29 is attached to the rectangular end surface of the duct body 27z arranged at a longitudinal direction terminal end of the air conditioning duct 13. The closing member 29 closes a terminal end opening surrounded by the rectangular end surface of the duct body 27z. As with the face plate member 25, the closing member 29 may be made of the foamed resin material. If the closing member 29 is made of a sound absorbing material (such as glass wool), air-conditioning noises can be prevented from being transmitted to the car interior, which is useful.

Figure 5:
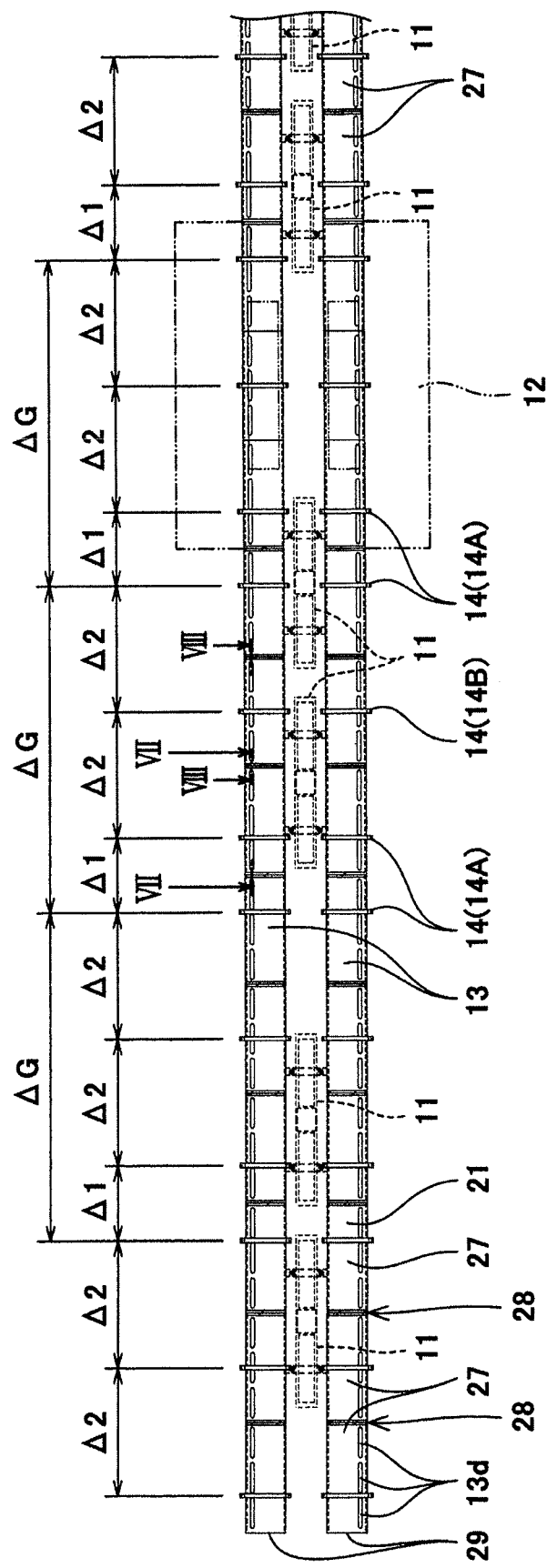
FIG. 5 a bottom view showing left and right air conditioning ducts and line flow fans accommodated in an internal space shown in FIG. 3, when viewed from below.

FIG. 5 is a bottom view showing the left and right air conditioning ducts 13 and line flow fans 11 accommodated in the internal space 3a shown in FIG. 3, when viewed from below. As shown in FIG. 5, the air conditioning duct 13 overlaps the air conditioner 12 in the upper/lower direction at the car lengthwise direction middle portion of the carbody 2. Therefore, a material having sound absorbency may be attached to the inner surface or outer surface of only a portion of the duct wall 21 of the air conditioning duct 13, the portion overlapping the air conditioner 12 in the upper/lower direction. With this, the air-conditioning noises generated by the air conditioner 12 can be prevented from being transmitted to the car interior.

The air conditioning duct 13 includes a plurality of blow-off ports 13d formed at the bottom wall of the air conditioning duct 13. The blow-off ports 13d are linearly lined up in the longitudinal direction of the air conditioning duct 13. The blow-off ports 13d are arranged at a car width direction outer edge portion of the bottom wall. With this, the blow-off ports 13d of the left air conditioning duct 13 and the blow-off ports 13d of the right air conditioning duct 13 are arranged so as to be separated from each other as much as possible in the car width direction.

The air conditioning ducts 13 are attached to the carbody 2 (in the present embodiment, the roof bodyshell 3) via a plurality of duct fixtures 14. The fixtures 14 are arranged at intervals in the longitudinal direction of the air conditioning duct 13. As described above, since the air conditioning duct 13 is lighter than the conventional duct, the duct fixtures 14 can be reduced in weight, and an arrangement interval between the adjacent duct fixtures 14 can be widened. Therefore, the weight reduction of the carbody 2 and the labor saving of rigging work at the roof bodyshell 3 can be achieved.

In the present embodiment, the duct fixtures 14 are provided for the duct bodies 27 in one-to-one correspondence. With this, each duct body 27 is supported by the duct fixture 14, and an unnecessary load does not act on the joint portion 28. A longitudinal direction size of the air conditioning duct 13 is about 15,000 to 20,000 mm, and a longitudinal direction size of the duct body 27 is about 700 to 1,200 mm. Therefore, the arrangement interval between the adjacent duct fixtures 14 can be set to be equal to the longitudinal direction size of the duct body 21. In a case where the arrangement intervals are unequal intervals as shown in FIG. 5, each of some of the intervals may be made wider than the longitudinal direction size of the duct body 27.

Figure 6:
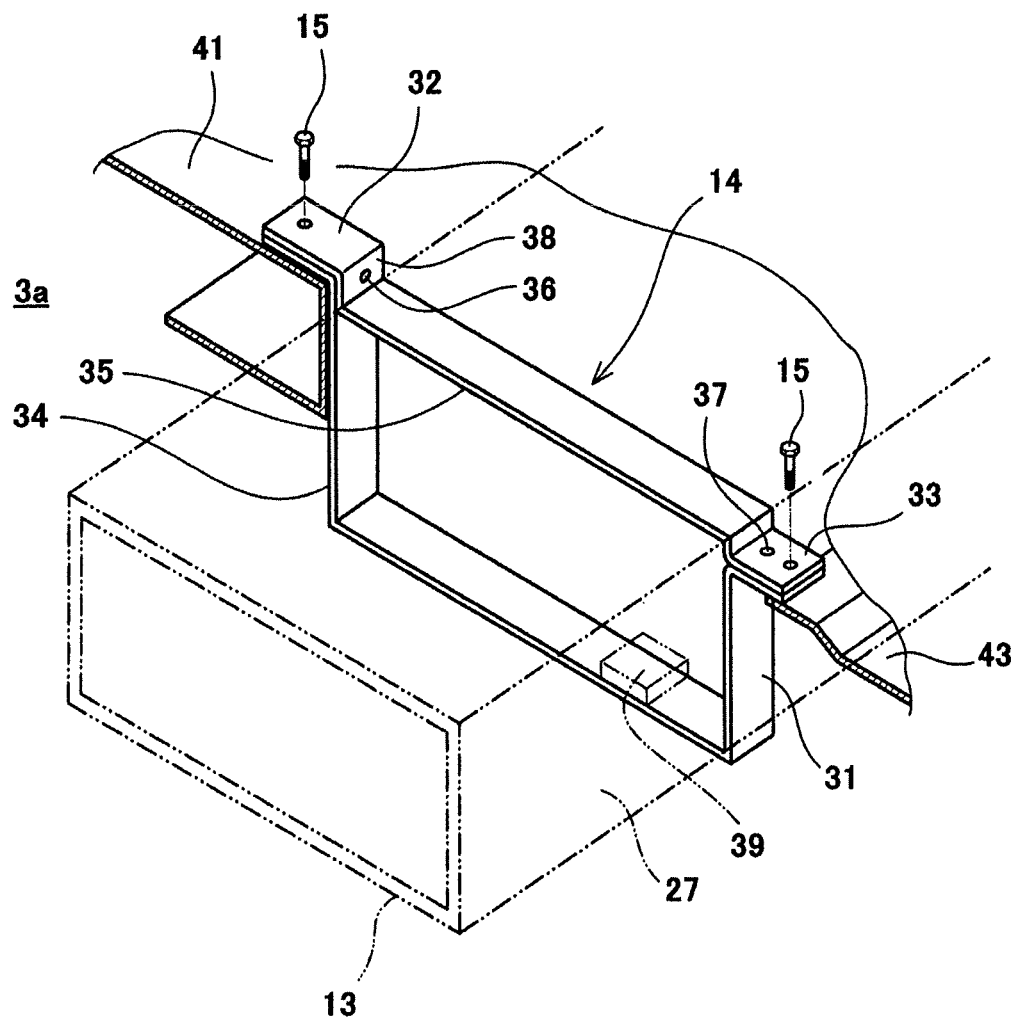
FIG. 6 is a perspective view showing a duct fixture shown in FIGS. 3 and 5.
Figure 7:
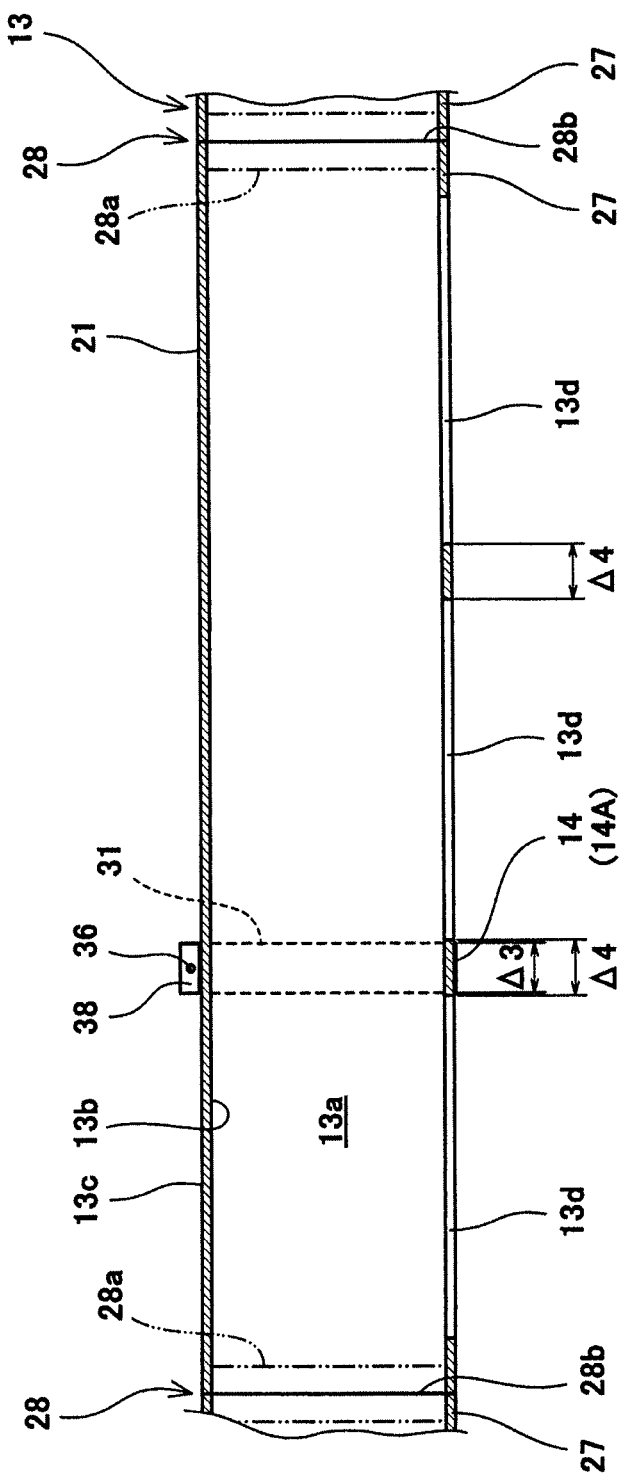
FIG. 7 is a cross-sectional view taken along lines VII of FIG. 5 and shows the air conditioning duct.
Figure 8:
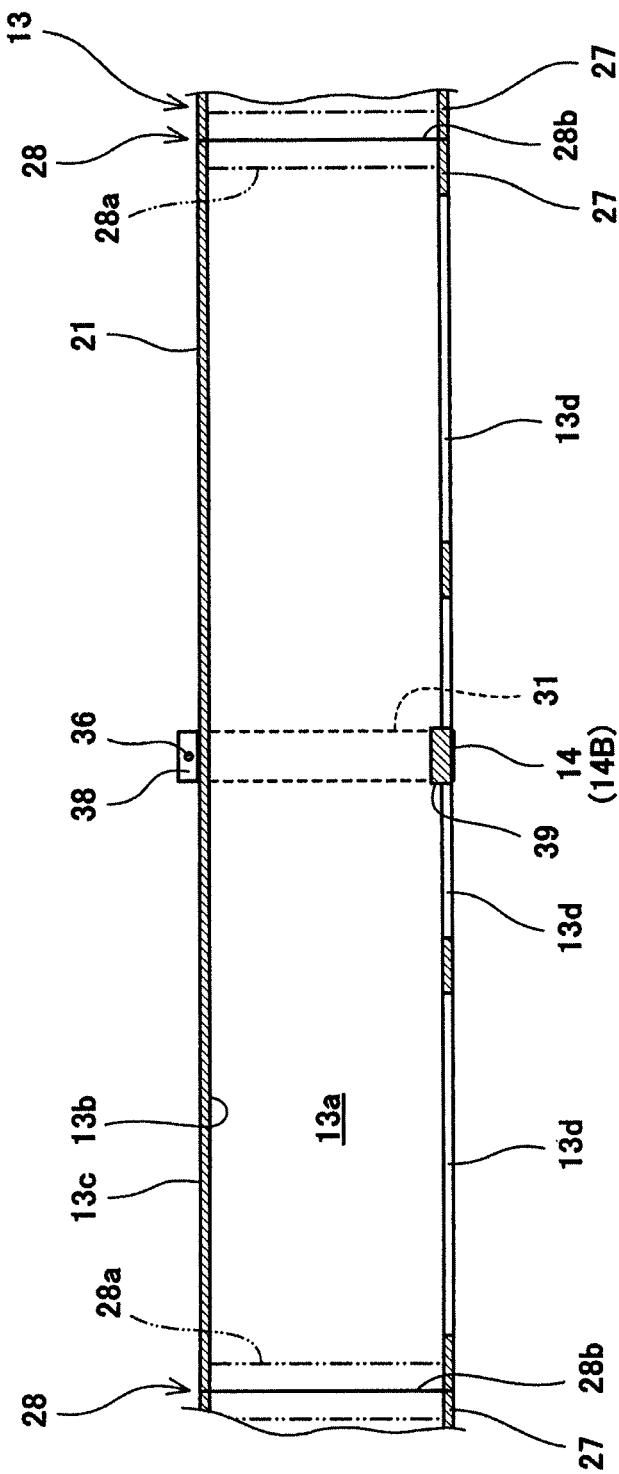
FIG. 8 is a cross-sectional view taken along lines VIII of FIG. 5 and shows the air conditioning duct.

FIG. 6 is a perspective view of the duct fixture 14 shown in FIGS. 3 and 5. The duct fixture 14 is constituted by a band-shaped metal plate made of aluminum or the like. Thus, the weight can be reduced, and the rigidity can be secured. The duct fixture 14 includes an engaging portion 31 and a pair of coupling portions 32 and 33. The engaging portion 31 is engaged with the air conditioning duct 13 from outside. The coupling portions 32 and 33 project from the engaging portion 31 toward opposite sides in the car width direction and are coupled to the roof bodyshell 3. Both of the coupling portions 32 and 33 are coupled to a lower surface side of the roof plate 4 by using detachable coupling members 15, such as bolts. The air conditioning duct 13 is engaged with engaging portion 31 located between the coupling portions 32 and 33, and is accommodated in the internal space 3a of the roof bodyshell 3 in a state where the air conditioning duct 13 is suspended and supported by the roof plate 4.

The duct fixture 14 has a frame shape and is wound around the outer surface of the air conditioning duct 13 once. Therefore, the air conditioning duct 13 can be restricted from moving in the upper/lower direction and the car width direction. Thus, the position of the air conditioning duct 13 relative to the roof bodyshell 3 is stabilized.

At least the engaging portion 31 of the duct fixture 14 is constituted by combining two or more separated parts. In the present embodiment, the engaging portion 31 is constituted by a band plate-shaped first part 34 and a band plate-shaped second part 35 which are separated from each other in the upper/lower direction. With this, when causing the duct fixtures 14 to be engaged with the long air conditioning duct 13, it is unnecessary to sequentially fitting the frame-shaped engaging portions 31 to the air conditioning duct 13 from the terminal end of the air conditioning duct 13. Thus, work of assembling the duct fixtures 14 to the air conditioning duct 13 can be simplified.

The first part 34 constitutes a lower portion of the engaging portion 31 and has a U shape. The first part 34 is engaged with at least an outer bottom surface of the bottom wall of the duct wall 21 of the air conditioning duct 13 and lower portions of outer surfaces of the left and right side walls of the duct wall 21 of the air conditioning duct 13. In the present embodiment, since the coupling portion 32 located at an inner side in the car width direction is arranged above the engaging portion 31, the first part 34 is engaged with an outer surface of the car width direction inner side wall entirely in the upper/lower direction. The second part 35 constitutes an upper portion of the engaging portion 31 and is engaged with at least an outer upper surface of the upper wall of the duct wall 21. In the present embodiment, since the coupling portion 33 located at an outer side in the car width direction is arranged between upper and lower end portions of the engaging portion 31 in the upper/lower direction, a portion of the second part 35 which constitutes the engaging portion 31 has an inverted L shape and is engaged with an upper portion of the car width direction outer side wall of the duct wall 21. The second part 35 is engaged with the upper wall and the side wall, so that when the duct fixture 14 is assembled to the air conditioning duct 13, the second part 35 can be positioned relative to the air conditioning duct 13 in the car width direction. Thus, the assembling work is simplified.

One end of the first part 34 further projects upward from the portion engaged with the car width direction inner side wall of the duct wall 21 and is then bent and extends toward the inner side in the car width direction. One end of the second part 35 is bent at a car width direction inner end portion of the portion engaged with the upper wall of the duct wall 21, then overlaps the first part 34 and projects upward to constitute a standing portion 38, and is again bent to overlap the first part 34 and extend toward the inner side in the car width direction. The coupling portion 32 is constituted by the portions extending toward the inner side in the car width direction in this stacked state. In contrast, the other end of the first part 34 is bent at an upper end portion of the portion engaged with the car width direction inner side wall of the duct wall 21 and extends toward the outer side in the car width direction. Then, the other end of the second part 35 is bent at a lower end portion of the portion engaged with the car width direction outer side wall of the duct wall 21, and then overlaps the first part 34 and extends toward the outer side in the car width direction. The coupling portion 33 is constituted by the portions extending toward the outer side in the car width direction in this stacked state.

The first part 34 and the second part 35 are coupled to each other by using detachable fixtures 36 and 37. Before the duct fixture 14 is assembled to the roof bodyshell 3, the duct fixture 14 can be firmly engaged with the air conditioning duct 13 by the engaging portion 31. When attaching the coupling portions 32 and 33 to the roof bodyshell 3 by using the coupling members 15, the duct fixture 14 engaged with the air conditioning duct 13 can be assembled to the roof bodyshell 3, and at the same time, the first part 34 and the second part 35 in the stacked state can be fastened to each other by the coupling members 15. Thus, the duct fixture 14 constituted by a plurality of parts can be strongly assembled.

Referring again to FIG. 5, the duct fixtures 14 are arranged at unequal intervals, and the unequal intervals include first arrangement intervals Δ1 and second arrangement intervals Δ2 each wider than the first arrangement interval Δ1. The duct fixtures 14 are arranged at intervals in the longitudinal direction such that an arrangement interval group ΔG including one first arrangement interval Δ1 and two second arrangement intervals Δ2 is repeated. The arrangement interval group ΔG corresponds to the sum of longitudinal direction sizes of three duct bodies 27.

Therefore, two duct fixtures 14 adjacent to each other with the first arrangement interval Δ1 therebetween constitute a proximate fixture group 14A, and one duct fixture 14 (hereinafter referred to as a "single fixture 14B") is arranged between two proximate fixture groups 14A. The single fixture 14B is arranged so as to be spaced apart from each of the two proximate fixture groups 14A by the second arrangement interval Δ2.

Referring again to FIG. 3, the internal space 3a of the roof bodyshell 3 accommodates a middle portion rig body 40C and right and left side portion rig bodies 40R and 40L. The middle portion rig body 40C is arranged on or in the vicinity of a car width center line. Each of the right and left side portion rig bodies 40R and 40L is arranged at a car width direction outer side of the ceiling plate 5. The left and right air conditioning ducts 13 are arranged so as to sandwich the middle portion rig body 40C in the car width direction. Further, the left air conditioning duct 13 is arranged so as to be sandwiched between the middle portion rig body 40C and the left side portion rig body 40L in the car width direction, and the right air conditioning duct 13 is arranged so as to be sandwiched between the middle portion rig body 40C and the right side portion rig body 40R in the car width direction.

For example, the middle portion rig body 40C includes the wiring bodies 7, the line flow fans 11, and a wire attachment bracket 41. The wire attachment bracket 41 is located at an upper portion of the internal space 3a and extends in the car lengthwise direction. The wire attachment bracket 41 includes an upper wall and left and right side walls and has an inverted U-shaped cross section. The wire attachment bracket 41 is symmetrical to the car width center line of the carbody 2 in the car width direction. The wire attachment bracket 41 is assembled to the roof bodyshell 3 in such a manner that left and right edge portions of the upper wall of the wire attachment bracket 41 are fastened to a car width direction middle portion of the lower surface of the roof plate 4 via carlines or ceiling inside frames. The wiring body 7 is suspended and supported by the lower surface of the upper wall of the wire attachment bracket 41 and is surrounded by the wire attachment bracket 41. The line flow fan 11 is arranged under the wire attachment bracket 41 and above the ceiling plate 5.

For example, the right side portion rig body 40R includes the right interior light 8. The right interior light 8 is arranged between a car width direction outer edge portion (right edge portion) of the ceiling plate 5 and a car width direction inner edge portion of the right side ceiling 6. A housing 42 including a socket (not shown) electrically and mechanically connected to the right interior light 8 is located between the ceiling plate 5 and the right side ceiling 6 and accommodated in the internal space 3a from below. A strap attachment bracket 43 is provided above the right interior light 8 and is fixed to a lower side of the roof plate 4 via the carline or the ceiling inside frame. The strap rod bracket 9 (see FIG. 1) is supported by the roof plate 4 and hangs down from between the ceiling plate 5 and the right side ceiling 6 to the car interior. The left side portion rig body 40L is configured in the same manner as the right side portion rig body 40R. The following components of the rig bodies 40C, 40R, and 40L are just examples, and each of the rig bodies 40C, 40R, and 40L may include other members or devices.

The car width direction inner side wall of the duct wall 21 is arranged so as to extend along an upper/lower direction, and the side walls of the wire attachment bracket 41 are also arranged so as to extend along the upper/lower direction. The engaging portion 31 engaged with the duct wall 21 tightly contacts or adjacently opposes to the side wall of the wire attachment bracket 41. Therefore, even if the duct wall 21 tries to rotate around the upper/lower direction axis at the time of the vibration of the carbody 2, even if the duct wall 21 tries to rotate around a car lengthwise direction axis at the time of the vibration of the carbody 2, or even if the duct wall 21 tries to move in the car width direction at the time of the vibration of the carbody 2, the wire attachment bracket 41 can restrict such rotation or movement.

The coupling portion 32 located at the inner side in the car width direction is placed on an upper surface of the upper wall of the wire attachment bracket 41 and is fastened to the wire attachment bracket 41 by using the coupling member 15. With this, the labor of the rigging work of the roof bodyshell 3 can be saved. The first part 34 and second part 35 of the duct fixture 14 are assembled by using the fixture 36 at the inner side in the car width direction. A curvature of a continuous portion of the upper and side walls of the wire attachment bracket 41 is smaller than a curvature of a continuous portion of the standing portion 38 and coupling portion 32 of the duct fixture 14. Therefore, while the engaging portion 31 tightly contacts or adjacently opposes to the wire attachment bracket 41, a gap is formed between the duct fixture 14 and the wire attachment bracket 41. The fixture 36 is attached to the standing portion 38 so as to be accommodated in this gap. Therefore, when assembling the duct fixture 14 to the roof bodyshell 3, the fixture 36 does not interfere with the middle portion rig body 40C.

The air conditioning duct 13 is supported on an upper surface of the ceiling plate 5 via a buffer member 16. The buffer member 16 is interposed between an outer bottom surface of the air conditioning duct 13 and the ceiling plate 5 and suppresses the vibration of the air conditioning duct 13 caused by the vibration of the carbody 2. It is preferable that the buffer member 16 have elasticity. The buffer member 16 includes an outer side portion and an inner side portion. The outer side portion of the buffer member 16 extends on the outer bottom surface of the air conditioning duct 13 in the car lengthwise direction along car width direction outer edge portions of the blow-off ports 13d. The inner side portion of the buffer member 16 extends on the outer bottom surface of the air conditioning duct 13 in the car lengthwise direction along car width direction inner edge portions of the blow-off ports 13d. The conditioned air from the blow-off ports 13d flows through a gap between the outer side portion and inner side portion of the buffer member 16 to be supplied through the grills of the ceiling plate 5 to the car interior. To prevent the conditioned air from the air conditioning duct 13 from leaking to the internal space 3a, it is preferable that the buffer member 16 have airtightness. To secure the elasticity and the airtightness, for example, a synthetic sponge or a rubber sponge may be used as the buffer member 16.

The blow-off ports 13d are provided at the car width direction outer edge portion of the bottom wall of the duct wall 21. The car width direction outer edge portion of the lower portion of the air conditioning duct 13 is supported by the ceiling plate 5 via the buffer member 16. As described above, the car width direction inner side portion of the upper portion of the air conditioning duct 13 may be supported by the side wall of the wire attachment bracket. Since the air conditioning duct 13 is supported as above by two diagonal points in a cross section of the air conditioning duct 13, the position of the air conditioning duct 13 in the internal space 3a can be stabilized.

The car width direction outer side walls of the duct walls 21 are arranged so as to be slightly spaced apart from the respective side portion rig bodies 40R and 40L. The coupling portion 33 located at the outer side in the car width direction extends through this space in the car width direction to be placed on an upper surface of the strap attachment bracket 43 and is fastened to the strap attachment bracket 43. With this, the labor of the rigging work of the roof bodyshell 3 can be saved. The first part 34 and second part 35 of the duct fixture 14 are assembled by the fixture 37 at the outer side in the car width direction. The coupling portion 33 is arranged so as to extend through the above space. The fixture 36 is attached inside this space. Therefore, when assembling the duct fixture 14 to the roof bodyshell 3, the fixture 37 does not interfere with the side portion rig body 40R or 40L.

The foregoing has explained the embodiment. Modifications, additions, and eliminations may be suitably made to the above configurations within the scope of the present invention.

Figure 9:
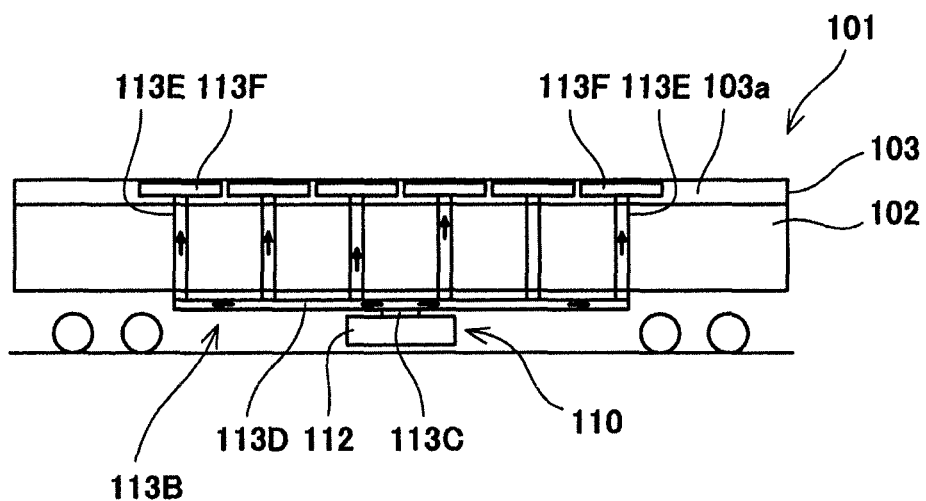
FIG. 9 is a schematic side cross-sectional view showing a schematic configuration of the railcar according to Modification Example.
Figure 10:
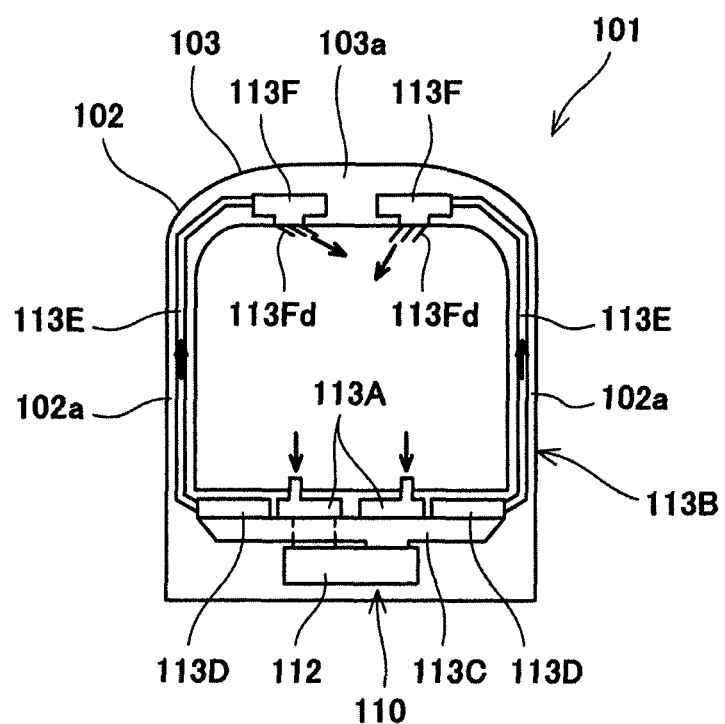
FIG. 10 is a schematic front cross-sectional view showing a schematic configuration of the railcar shown in FIG. 9.

FIG. 9 is a schematic side cross-sectional view showing a schematic configuration of a railcar 101 according to Modification Example. FIG. 10 is a schematic front cross-sectional view showing a schematic configuration of the railcar 101 according to Modification Example. The railcar 101 shown in FIGS. 9 and 10 includes an air conditioning system 110 of a so-called underfloor concentrated type, and an air conditioner 112 is arranged under a floor of a carbody 102. The air conditioning system 110 includes a return duct 113A and a supply duct 113B. The return duct 113A takes air from the car interior and guides the taken air to a suction side of the air conditioner 112. The supply duct 113B guides the conditioned air, flowing from a blow-off side of the air conditioner 112, to supply the conditioned air to the car interior. The supply duct 113B includes an underfloor duct 113C, left and right floor inside ducts 113D, a rising duct 113E, and a ceiling duct 113F. The underfloor duct 113C is arranged under the floor and guides the conditioned air flowing from the air conditioner 112. The left and right floor inside ducts 113D are arranged inside the floor so as to be separated from each other in the car width direction and guides the conditioned air flowing from the underfloor duct 113C. The rising duct 113E is arranged at a side bodyshell 102a, extends in the upper/lower direction, and guides upward the conditioned air flowing from the floor inside ducts 113D. The ceiling duct 113F is arranged in an internal space 103a of a roof bodyshell 103, extends in the car lengthwise direction, and guides the conditioned air flowing from the rising duct 113E. The conditioned air is supplied to the car interior through blow-off ports 113Fd provided at the ceiling duct 113.

The above embodiment has explained a case where the air conditioning duct having the duct wall made of the foamed resin material is applied to a duct arranged at a similar position and having a similar function to the ceiling duct 113F of Modification Example. This duct wall may be applied to the return duct 113A or may be applied to the underfloor duct 113C, floor inside duct 113D, or rising duct 113E of the supply duct 113B.

The air conditioning duct is applicable to other type air conditioning systems (such as a ceiling distributed type air conditioning system and a split type air conditioning system) of railcars. The air conditioning duct is applicable to not only the railcars but also large vehicles, such as aircrafts, ships, and buses.

INDUSTRIAL APPLICABILITY

The present invention has an operational advantage of being able to provide a car air-conditioning duct improved so as to simultaneously satisfy various requirements of design (such as the shape stability, the lightness, the airtightness, the heat insulating property, and the simplification of the production step) and a railcar including the car air-conditioning duct. The present invention is widely applicable to cars including air conditioners.

REFERENCE SIGNS LIST 1, 101 railcar
2, 102 carbody
3, 103 roof bodyshell
3a, 103a internal space
10, 110 air conditioning system
12, 112 air conditioner
13 air conditioning duct
113A return duct
113B supply duct
13b duct inner surface
13c duct outer surface
14 duct fixture
21 duct wall
27 duct body
29 closing member

The invention claimed is:
1. A car air-conditioning duct configured to guide air to a suction side of an air conditioner mounted on a car or guide the air flowing from a blow-off side of the air conditioner mounted on the car, the car air-conditioning duct comprising:

a duct wall having a tubular shape, a plurality of duct fixtures, the duct wall being attached to the car by the plurality of duct fixtures, the duct wall forming a duct outer surface and a duct inner surface, the duct wall being made of a composite foamed resin material containing polystyrene resin and polyolefin resin, a content ratio of the polystyrene resin and a content ratio of the polyolefin resin each having a gradient in a thickness direction of the duct wall, the content ratio of the polyolefin resin being higher than the content ratio of the polystyrene resin at the duct outer surface and the duct inner surface, the duct wall having a rectangular cross section in which two face plate members are joined to each other at end edges thereof, the two face plate members having respective L-shaped cross sections arranged point symmetrically, being made of the composite foamed resin material, each of the plurality of duct fixtures comprising a frame-shaped engaging portion engaged with the duct wall from outside the duct and coupling portions projecting from the engaging portion in a car width direction so as to separate from each other, the engaging portion and the coupling portions being constituted by a band plate-shaped first part and a band plate-shaped second part, the first part and the second part being separated from each other in an upper/lower direction, the first part and the second part being stacked on each other at the coupling portions, the first part and the second part in a stacked state being also fastened to each other in the upper/lower direction by the duct fixtures and attachable to the car by the duct fixtures.

2. The car air-conditioning duct according to claim 1, further comprising:

a closing member attached to a longitudinal direction terminal end portion of the duct wall, wherein the closing member is made of a sound absorbing material.

3. A railcar comprising:

an air conditioner configured to adjust a temperature of suctioned air and blow out the air; and an air conditioning duct configured to guide air to a suction side of the air conditioner or guide the air flowing from a blow-off side of the air conditioner, the air conditioning duct including:

a duct wall having a tubular shape and forming a duct outer surface and a duct inner surface, and a plurality of duct fixtures, the duct wall being attached to the car by the plurality of duct fixtures, the duct wall being made of a composite foamed resin material containing polystyrene resin and polyolefin resin, a content ratio of the polystyrene resin and a content ratio of the polyolefin resin each having a gradient in a thickness direction of the duct wall, the content ratio of the polyolefin resin being higher than the content ratio of the polystyrene resin at the duct outer surface and the duct inner surface, the duct wall having a rectangular cross section in which two face plate members are joined to each other at end edges thereof, the two face plate members having respective L-shaped cross sections arranged point symmetrically, being made of the composite foamed resin material, the duct wall having a rectangular cross section in which two face plate members are joined to each other at end edges thereof, the two face plate members being arranged point symmetrically, being made of the composite foamed resin material, each having an L-shaped cross section, each of the plurality of duct fixtures comprising a frame-shaped engaging portion engaged with the duct wall from outside the duct and coupling portions projecting from the engaging portion in a car width direction so as to separate from each other, the engaging portion and the coupling portions being constituted by a band plate-shaped first part and a band plate-shaped second part, the first part and the second part being separated from each other in an upper/lower direction, the first part and the second part being stacked on each other at the coupling portions, the first part and the second part in a stacked state being also fastened to each other by the duct fixtures and attached to the car by the duct fixtures.

4. The railcar according to claim 3, wherein:

the air conditioning duct is arranged in an internal space, the internal space is formed at a carbody, the air conditioning duct includes a plurality of duct bodies each formed in a tubular shape by the duct wall, the duct bodies are coupled to one another in a longitudinal direction, and the plurality of duct fixtures correspond to the plurality of duct bodies in one-to-one correspondence.

5. The railcar according to claim 4, wherein each of the duct bodies has a size of 700 mm to 1,200 mm in the longitudinal direction.

6. The car air-conditioning duct according to claim 1, wherein:

each of the engaging portions is engaged with an outer bottom surface of a bottom wall of the duct wall, outer surfaces of left and right side walls of the duct wall, and an outer upper surface of an upper wall of the duct wall;

the first part is engaged with at least the outer bottom surface of the bottom wall of the duct wall and the outer surfaces of the left and right side walls of the duct wall; and the second part is engaged with at least the outer upper surface of the upper wall of the duct wall.

7. The railcar according to claim 3, wherein:

each of the engaging portions is engaged with an outer bottom surface of a bottom wall of the duct wall, outer surfaces of left and right side walls of the duct wall, and an outer upper surface of an upper wall of the duct wall;

the first part is engaged with at least the outer bottom surface of the bottom wall of the duct wall and the outer surfaces of the left and right side walls of the duct wall; and the second part is engaged with at least the outer upper surface of the upper wall of the duct wall.

8. A car air-conditioning duct configured to guide air to a suction side of an air conditioner mounted on a car or guide the air flowing from a blow-off side of the air conditioner mounted on the car, the car air-conditioning duct comprising:

a duct wall having a tubular shape, a plurality of duct fixtures, the duct wall being attached to the car by the plurality of duct fixtures, the duct wall forming a duct outer surface and a duct inner surface, the duct wall being made of a composite foamed resin material containing polystyrene resin and polyolefin resin, a content ratio of the polystyrene resin and a content ratio of the polyolefin resin each having a gradient in a thickness direction of the duct wall, the content ratio of the polyolefin resin being higher than the content ratio of the polystyrene resin at the duct outer surface and the duct inner surface, the duct wall having a rectangular cross section in which two face plate members are joined to each other at end edges thereof, the two face plate members having respective L-shaped cross sections arranged point symmetrically, being made of the composite foamed resin material, the duct wall having a rectangular cross section in which two face plate members are joined to each other at end edges thereof, the two face plate members being arranged point symmetrically, being made of the composite foamed resin material, each having an L-shaped cross section, each of the plurality of duct fixtures comprising a frame-shaped engaging portion engaged with the duct wall from outside the duct and coupling portions projecting from the engaging portion toward opposite sides in a car width direction.

\* \* \* \* \*